(12) United States Patent
McCaskill

(10) Patent No.: US 6,980,485 B2
(45) Date of Patent: Dec. 27, 2005

(54) AUTOMATIC CAMERA TRACKING USING BEAMFORMING

(75) Inventor: John McCaskill, Leander, TX (US)

(73) Assignee: Polycom, Inc., Milpitas, CA (US)

( * ) Notice: Subject to any disclaimer, the term of this patent is extended or adjusted under 35 U.S.C. 154(b) by 667 days.

(21) Appl. No.: 10/004,070

(22) Filed: Oct. 25, 2001

(65) Prior Publication Data
US 2003/0081504 A1 May 1, 2003

(51) Int. Cl.[7] ............................................. G01S 3/80
(52) U.S. Cl. ...................................................... 367/119
(58) Field of Search ................................. 367/125, 118, 367/124, 119, 121; 348/14.01, 14.07, 14.16

(56) References Cited

U.S. PATENT DOCUMENTS

| | | | |
|---|---|---|---|
| 4,858,012 A | | 8/1989 | Hino |
| 5,068,735 A | | 11/1991 | Tuchiya |
| 5,396,287 A | | 3/1995 | Cho |
| 5,438,357 A | * | 8/1995 | McNelley ............... 348/14.16 |
| 5,528,289 A | * | 6/1996 | Cortjens et al. ......... 348/14.05 |
| 5,561,519 A | | 10/1996 | Parker |
| 5,581,620 A | * | 12/1996 | Brandstein et al. ......... 367/125 |
| 5,583,565 A | * | 12/1996 | Cortjens et al. ........... 348/14.1 |
| 5,631,699 A | | 5/1997 | Saito |
| 5,684,528 A | | 11/1997 | Okutsu |
| 5,686,957 A | * | 11/1997 | Baker ...................... 348/14.07 |
| 5,719,622 A | | 2/1998 | Conway |
| 5,778,082 A | * | 7/1998 | Chu et al. ................ 348/14.07 |
| 5,844,599 A | * | 12/1998 | Hildin ...................... 348/14.1 |
| 5,859,663 A | | 1/1999 | Simon |
| 5,940,118 A | | 8/1999 | Van Schyndel |
| 5,940,188 A | * | 8/1999 | Kurozasa .................... 358/436 |
| 5,959,667 A | * | 9/1999 | Maeng .................... 348/14.08 |
| 6,005,610 A | * | 12/1999 | Pingali .................... 348/14.16 |
| 6,008,837 A | | 12/1999 | Yonezawa |
| 6,014,167 A | | 1/2000 | Suito |

\* cited by examiner

Primary Examiner—Daniel T. Pihulic
(74) Attorney, Agent, or Firm—Wong, Cabello, Lutsch, Rutherford & Brucculieri, LLP

(57) ABSTRACT

An acoustic tracking system that uses an array of microphones to determine the location of an acoustical source. Several points in space are determined to be potential locations of an acoustical source. Beamforming parameters for the array of microphones are determined at each potential location. The beamforming parameters are applied to the sound received by the microphone array for all of the potential locations and data is gathered for each beam. The most likely location is then determined by comparing the data from each beam. Once the location is determined, a camera is directed toward this source.

16 Claims, 6 Drawing Sheets

AUTOMATIC CAMERA TRACKING USING BEAMFORMING

BACKGROUND OF THE INVENTION

1. Field of the Invention

The invention relates generally to videoconferencing systems and more specifically to camera tracking of videoconference participants.

2. Description of Related Art

When people wish to communicate from remote locations, a videoconferencing system is a convenient way to share ideas. Typically, there is more than one person participating in a videoconference. A camera must, therefore, be positioned to frame everyone in the room. However, such camera shots are impersonal and do not allow the recipient of the image to pick up on nuances of the speaker's facial expressions because they lack sufficient detail. Manually tracking the camera from one speaker to the next is inconvenient and distracting. There are a number of prior art patents in this field directed to solving this problem.

For example, U.S. Pat. No. 5,686,957 to Baker teaches automatic tracking by using a plurality of microphones and a crude audio detection circuit. Because the audio detection mechanism is limited in its ability to locate sound, a special camera is used to enhance the peripheral portion of the field of view. The camera rotates in approximately 30 degree increments in order to frame the general location of the speaker.

U.S. Pat. No. 5,778,082 to Chu teaches automatic tracking by using a plurality of microphones and a processor. The processor determines when an acoustic signal begins at each microphone, and then locates the direction of the source based on a comparison of data from each microphone. The system, however, requires processor intensive Fast Fourier Transform calculations to be made continuously.

U.S. Pat. No. 5,940,118 to Van Schyndel teaches automatic tracking using an optical transducer that takes visual cues (e.g., a moving mouth) to point the camera toward the location of the speaker. The method requires a very advanced processor, an optical transducer, and is subject to many false signals (e.g., one participant whispering to a neighbor).

U.S. Pat. No. 5,959,667 to Maeng teaches automatic tracking using a microphone array and a set of preset values. The preset values include a set of camera parameters that define a particular camera shot. The microphone array locates the position of the speaker, and the position is compared to the preset values. The camera then tracks to the closest preset position. The method also requires a very powerful processor because the speaker location has to be continuously calculated.

U.S. Pat. No. 6,005,610 to Pingali teaches a method for localizing a speaker based on concurrent analysis of a video image and plural microphone signals. The position of the speaker is tracked as the speaker changes position.

U.S. Pat. No. 5,438,357 to McNelley teaches a method for image manipulation that creates the impression of eye contact between video conferencing parties. The camera is manipulated to track a speaker such that their image is centered on a display.

U.S. Pat. No. 5,528,289 to Cortjens et al. teaches a system for controlling devices on a computer network. The pan, tilt, and zoom of each camera is controlled via a pointing device such as joystick or mouse.

U.S. Pat. No. 5,581,620 to Brandstein et al. teaches a method for enhancing the reception of signals received at several locations using beamforming techniques. The location of a speaker is calculated and the information is used to align the phase of signals from multiple audio detectors. The signals originating from the speaker's location are added while signals from other locations are attenuated.

U.S. Pat. No. 5,583,565 to Cortjens et al. teaches a camera system that can be remotely controlled over a computer network for the purpose of video conferencing. Preset operational parameters are stored within the camera to increase the ease of operation. A user input device is used to control the camera.

U.S. Pat. No. 5,844,599 to Hildin teaches a video system in which a camera is directed at a voice activated emitter associated with a speaker. The emitters are detected using an infrared position signal and a video camera is directed at the emitter's location.

BRIEF SUMMARY OF THE INVENTION

In one embodiment, the invention provides an acoustic tracking system for determining the location of a sound producing acoustical source from a set of at least two user-defined locations. The system includes an array of microphones and a processor for performing various calculations. The processor can be any device that can make the necessary calculations such as a CPU, FPGA, and the like.

The calculations result in a set of beamforming parameters, a set of modified signals, and a result location. Each beamforming parameter within the set of beamforming parameters is associated with each user-defined location within the set of at least two user-defined locations. The set of modified signals is determined by applying each beamforming parameter within the set of beamforming parameters to the sound received by the array of microphones. The result location is then associated with the best modified signal within the set of modified signals. The best modified signal can be determined as a function of signal strength and duration.

In another embodiment, the invention provides a method for identifying the location of an audio source. The method includes the steps of defining at least two points where the audio source may be located, calculating beamforming parameters for each of the at least two points in space, receiving sound by a microphone array, applying each set of the beamforming parameters to the sound received by the microphones in the array, determining which set of beamforming parameters maximize the sum amplitude of the signals received by the microphone array; and identifying one of the at least two points in space associated with the set of beamforming parameters that maximize the sum amplitude of the microphone signals.

DETAILED DESCRIPTION OF THE INVENTION

Figure 1:
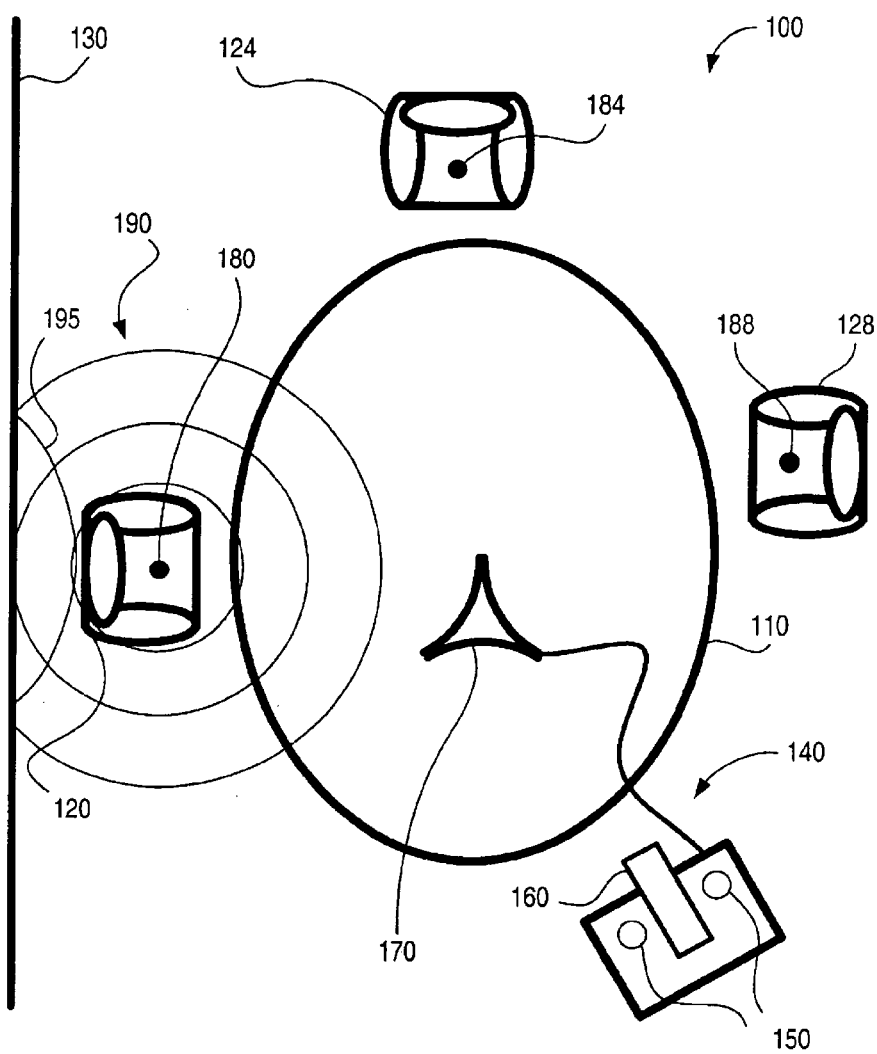
FIG. 1 is a top view of a video conference room including an embodiment of the present invention.

FIG. 1 shows a conference room 100. Room 100 has a table 110, three chairs 120, 124, and 128, a wall 130, and a videoconferencing system 140. Videoconferencing system 140 includes a microphone array 150, a video camera 160 and a movable microphone 170.

Movable microphone 170 receives the sound that is transmitted as the audio component of the teleconference to a remote location. Movable microphone 170 is typically kept away from video camera 160 so it does not pick up extraneous noise from the normal operation of video camera 160.

In one embodiment of the invention, microphone array 150 is positioned proximate to video camera 160. As will be described, microphone array 150 consists of at least two microphones, although a typical system would includes five or six microphones. Additionally, if the location of movable microphone 170 relative to videoconferencing system 140 was known, microphone 170 could also be configured to act as part of microphone array 150. In order to simplify the description of the invention all references to a microphone or microphones in this specification will refer to the microphones within microphone array 150.

Three potential audio sources 180, 184, and 188 are shown in room 100. Sound waves 190 are formed when one of potential audio sources 180 generates sound (i.e., a person who is sitting in chair 120 speaks). As will be described in connection with FIG. 2, videoconferencing system 140 can determine the location of an audio source by analyzing information gathered by microphone array 150 through the use of beamforming techniques. However, as sound waves 190 propagate from audio source 180, interference such as reverberation 195 off wall 130 may occur, causing error in beamforming analysis. Techniques are known in the art to reduce or eliminate such unwanted reverberation 195 in both the time domain and the frequency domains. Such techniques may be easily included in the systems and methods discussed herein without altering the scope and spirit of the invention.

Figure 2:
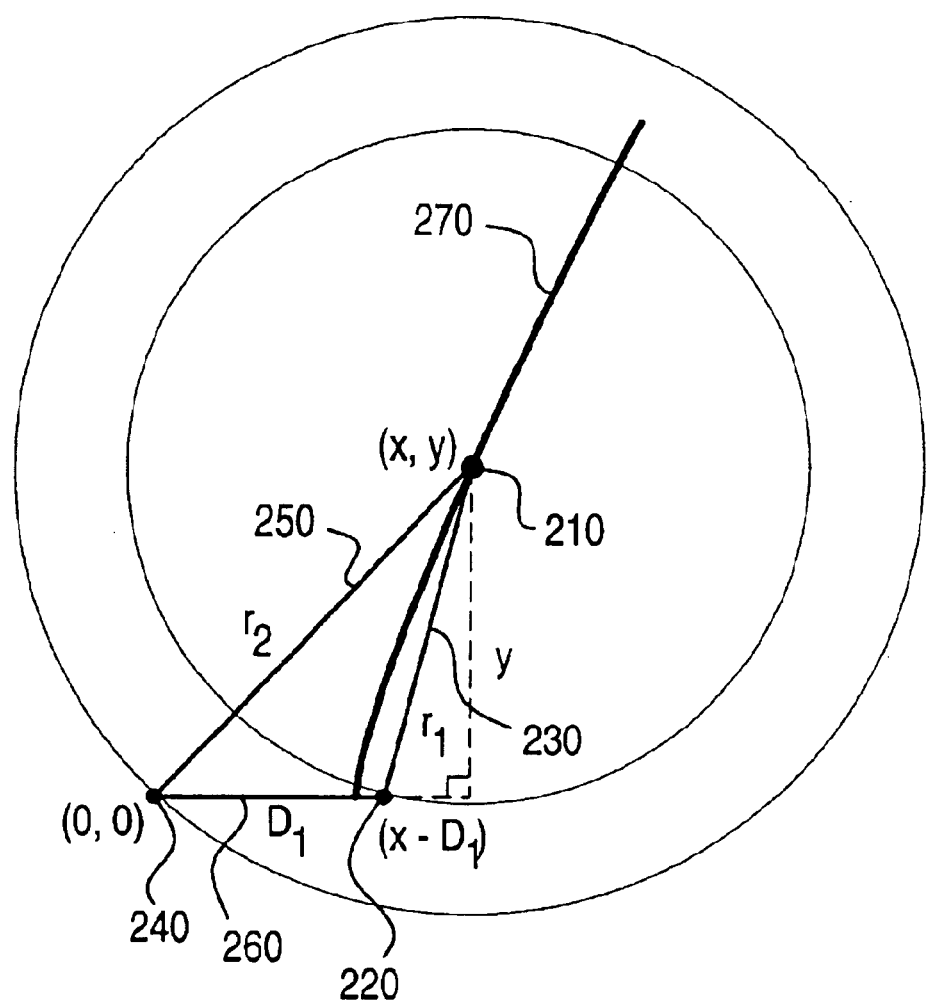
FIG. 2 is a mathematical representation of two audio sources generating a signal.

FIG. 2 illustrates an example of beamforming. An audio source 210 generates a signal that propagates radially in three dimensions. The signal travels according to the relationship r=S t, where S is the speed of sound, t is the time that elapsed since the signal was generated and r is the radius of the sphere that represents all points where the sound can be heard at a time t.

A first microphone 220, located an $r_1$ distance 230 from audio source 210, receives the signal at a time $t_1$, and a second microphone 240, located an $r_2$ distance 250 from audio source 210, receives the signal at a time $t_2$. As will be seen, it is advantageous to describe $t_2$ in terms of $\Delta t_2$, the difference in time between $t_1$ and $t_2$. Although $\Delta t_2$ is a positive number in FIG. 2, $\Delta t_2$ can be either positive or negative depending on the relative positions of audio source 210, first microphone 220 and second microphone 240. The beamforming calculation also requires a distance $D_1$ 260 between first microphone 220 and second microphone 240. The result of the beamforming calculation is a beam-line 270, along which the audio signal must have originated in order to produce the measured $\Delta t_2$.

By arbitrarily assigning the origin (0,0) of a Cartesian coordinate system to second microphone 240 and orienting the coordinates so first microphone 220 is on the X-axis, beam-line 270 can be described as a function of $\Delta t_2$ using the following equations:

$$x(t_1) = (D_1^2 + 2S^2 t_1 \Delta t_2 + S^2 \Delta t_2^2)/2D_1 \quad (1)\text{ and}$$

$$y(t_1, x) = \pm[S^2 t_1^2 - (x - D_1)^2]^{1/2} \quad (2).$$

Equations (1) and (2) are derived by applying Pythagoras' Theorem to the two right triangles with the hypotenuses $r_1$ distance 230 and $r_2$ distance 250, noting that $r_1 = S\, t_1$ and $r_2 = S\, t_2$, and substituting $(t_1 + \Delta t_2)$ for $t_2$. Once $\Delta t_2$ is known, the x position and y position will change as a function of $t_1$. While FIG. 2 shows beam-line 270 for positive values of y, it should be understood that there is a similar beam-line for negative values of y.

If the time $t_1$ that the signal takes to reach first microphone 220 is known, then equations (1) and (2) can be used to reduce the possible positions of audio source to one of two points ((x, y) and (x, -y)). However, since the $t_1$ time is usually not known, the most information that can be derived from microphone array 150 with only two microphones is that audio source 210 originated along beam line 270. A third microphone is required to determine the location of audio source 210 along beam-line 270.

Figure 3:
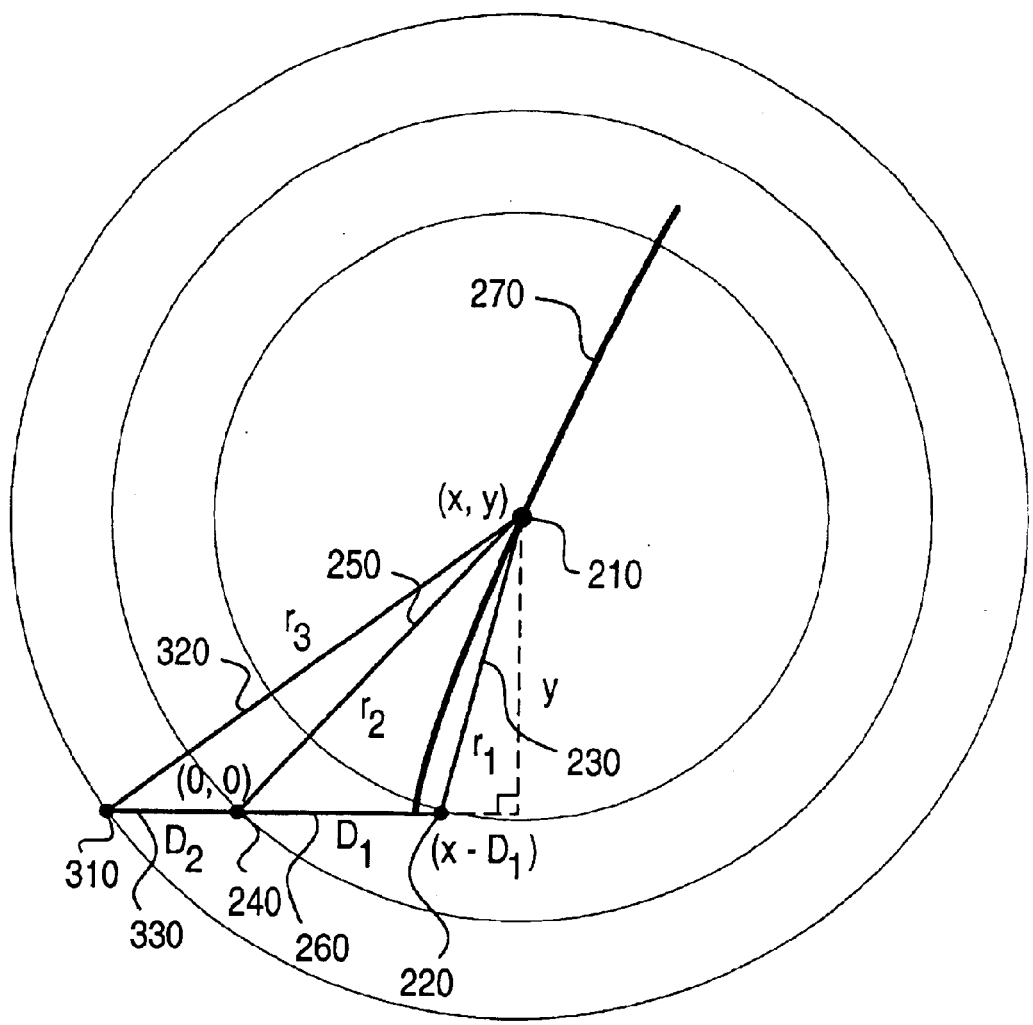
FIG. 3 is a mathematical representation of three microphones receiving an audio signal generated from one audio source.

FIG. 3 illustrates an example of beamforming using a third microphone 310. Third microphone 310 is located an $r_3$ distance 320 from audio source 210, receives the signal at a time $t_3$, and is a $D_2$ distance 330 from second microphone 240. By using equations (1) and (2), applying Pythagoras' Theorem to the right triangle with $r_3$ distance 320 as a hypotenuse, noting that $r_3 = S\, t_3$ and substituting $(t_1 + \Delta t_3)$ for $t_3$, the equation:

$$t_1 = (D_1 D_2^2 + D_1 S^2 \Delta t_3^2 - D_2 S^2 \Delta t_2^2 - D_1{}^2 D_2)/(2D_2 S^2 \Delta t_2 - 2D_1 S^2 \Delta t_3) \quad (3)$$

can be derived.

By combining the three equations, audio source 210 can be located by knowing $D_1$ distance 260 (the spacing between first microphone 240 and second microphone 220), $D_2$ distance 330 (the spacing between second microphone 220 and third microphone 310), and the $\Delta t_2$ and $\Delta t_3$ time intervals (the length of time between when second microphone 240 and third microphones 310 receive the signal relative to the time first microphone 220 receives the signal).

The three microphones 220, 240, and 310 are shown to be co-linear for simplicity. However, it should be appreciated that a non-co-linear arrangement of the three microphones enables identification of a pair of source positions, (x, y, z) and (x, y, -z), in three-dimensional space. The three non-co-linear microphones form a plane, and all points on one side of the plane are represented as positive z and points on the other side are represented as negative z. Although a fourth non-planar microphone can then be used to determine which side of the plane the source is located, all the potential audio sources are normally disposed on only one side of microphone array 150, so a fourth microphone is not necessary to locate a single point in space. However, additional microphones are desirable to provide error checking and accuracy.

Figure 4:
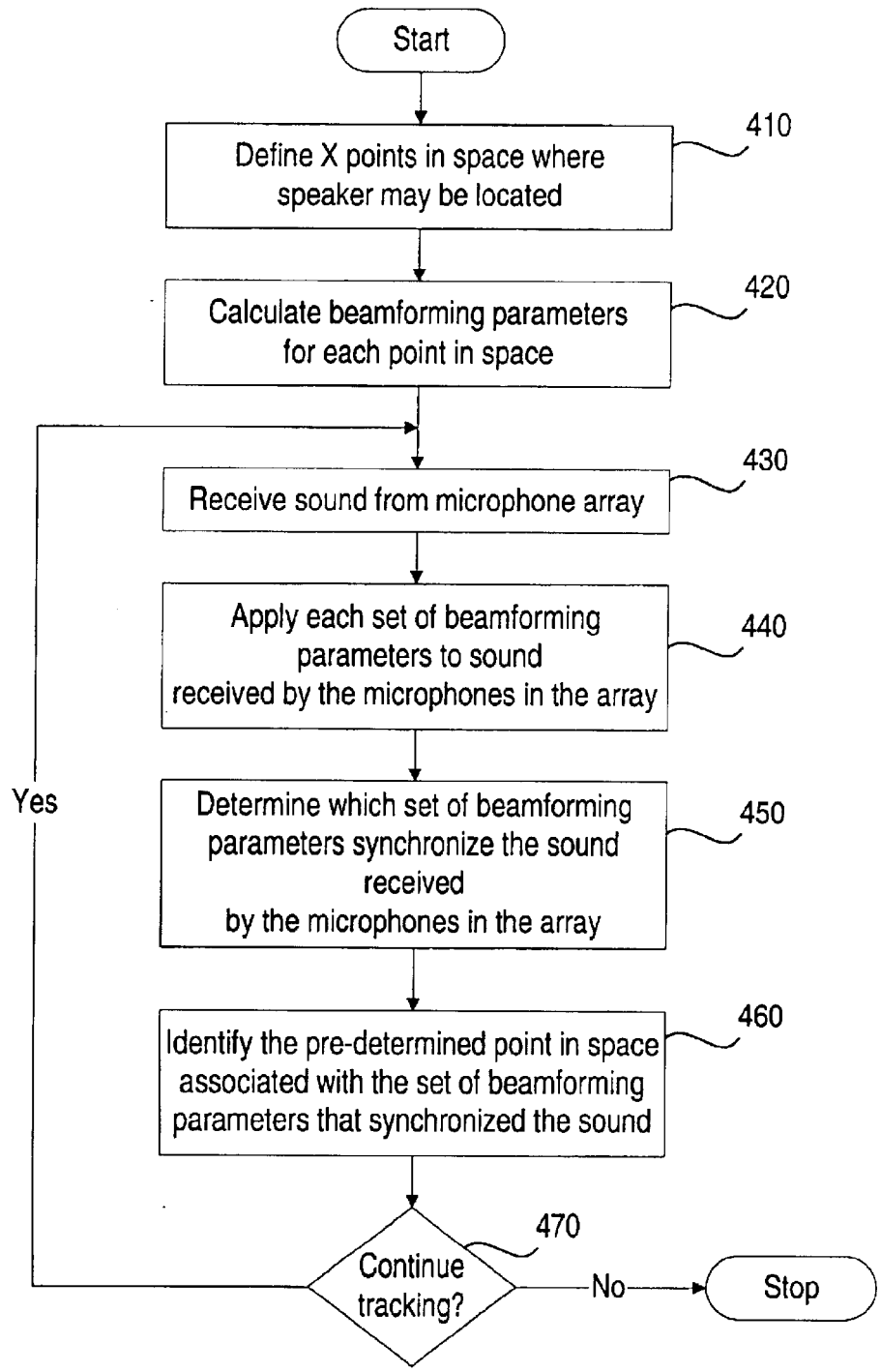
FIG. 4 is a flowchart of a preferred method of operation of the invention.

Using these principals, the flowchart in FIG. 4 illustrates the steps of a preferred embodiment of the invention. First, in step 410, the potential sources of sound are identified. Although only three potential sources are shown in FIG. 1, the invention can be used with any number of potential audio sources. There are many possible ways to identify potential audio sources. For example, the pan, tilt and zoom coordinates of camera 160 can be obtained by bringing potential audio sources into focus. Alternatively, a signaling device can be positioned next to each potential audio source, or a participant can make a sound during an initiation sequence. A pre-programmed matrix of different points in space can represent potential audio sources. These methods of identifying potential sources are merely illustrative and should not be considered a comprehensive list of methods known in the art.

After the potential sources are identified, next step 420 in FIG. 4 is to calculate beamforming parameters for each point in space. These parameters only need to be calculated once during initialization. Those skilled in the art will appreciate that, in the time domain, the beamforming parameters can represent the time difference between any pair of microphones, and are not restricted to $\Delta t$ values (i.e., the time difference between the first microphone and each other microphone in the microphone array). A "set" of beamforming parameters would represent all the beamforming parameters for a certain point in space. Therefore, if the microphone array had only two microphones, the set of beamforming parameters would consist of a single value. If the microphone array had six microphones, the set of beamforming parameters would include a minimum of three beamforming parameters for each potential audio source (although more beamforming parameters could be used for redundancy).

Figure 5:
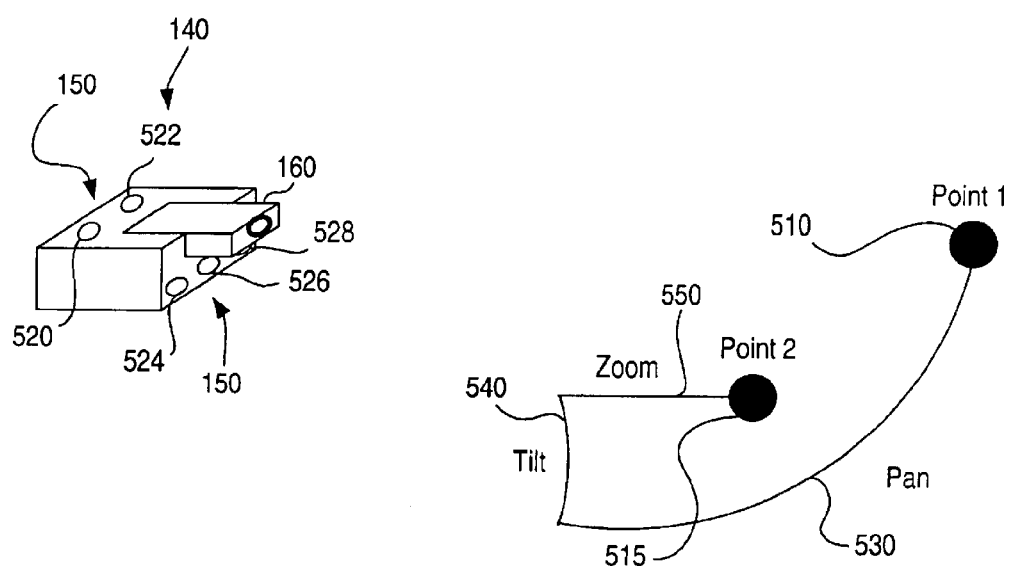
FIG. 5 is a diagram of a videoconferencing system and two pre determined points in space.

As an example of steps 410 and 420, FIG. 5 shows videoconferencing system 140, two potential audio sources 510 and 515, and five microphones 520, 522, 524, 526, and 528. Once pan 530, tilt 540, and zoom 550 of camera 160 are known for each potential source 510 and 515, the distance of each potential source 510 and 515 to each microphone 520, 522, 524, 526, and 528 is determined by applying trigonometric principles. Of course, the coordinates of each microphone 520, 522, 524, 526, and 528 in relation to camera 160 would need to be either known or calculated.

If microphone 520 was at location (X, Y, Z) in Cartesian coordinates, one of potential sources 180 was located at ($\rho$, $\phi$, $\theta$) in spherical coordinates, and the origin (0,0) of both the Cartesian coordinates and the spherical coordinates was the camera, the distance could be found with the following equation:

$$\text{Distance} = [(X - \rho \cos \theta \sin \phi)^2 + (Y - \rho \sin \theta \sin \phi)^2 + (Z - \rho \cos \phi)^2]^{1/2} \quad (4)$$

The time that it takes for a signal to reach any given Distance can be found by dividing the Distance by the speed of sound (about 1129 feet/second at 68 degrees Fahrenheit). Since knowing the absolute time required for a signal to travel to each microphone is not necessary only the change in time from one microphone to the next is stored in step 420.

In another aspect of the invention, the beamforming parameters are calculated in the frequency domain instead of the time domain. As is well known in the art, Fourier theory (including both the Fourier Series and the Fourier Transform) relates the time domain and the frequency domain. Furthermore, it is often useful to use a Fast Fourier Transform (FFT) as an approximation to the Fourier Transformation. The effects of background noise can be easily reduced in the frequency domain by, for example, applying greater weights to some frequencies or implementing a bandwidth filter. In the frequency domain, the beamforming parameters represent the changes in phase from one microphone to the next, and not the changes in time.

Referring back to FIG. 4, step 430 begins the process of camera tracking. In steps 430 sound is received by microphone array 150. In step 440 each set of beaming parameters are applied to the received sound. In step 450 videoconferencing system 140 determines which set of beamforming parameters synchronizes the sound received by microphone array 150. Then, in step 460, the location of the audio source is identified by matching the synchronizing beamforming parameters with its associated potential source of sound.

Figure 6A:
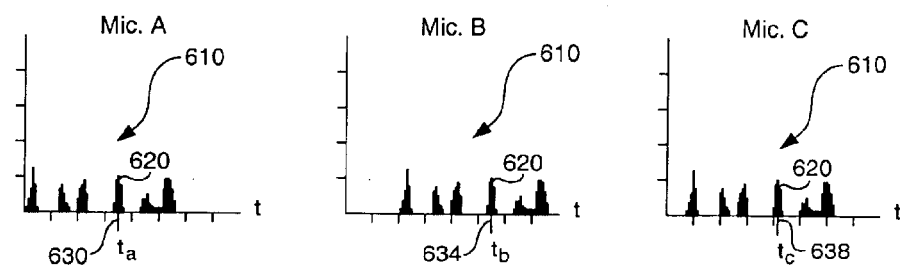
FIG. 6A is a mathematical representation of three microphones receiving a signal in the time domain.

As an example of steps 430 through 460, FIG. 6A shows graphs of a signal 610 received by three microphones in the time domain. The signal strength is shown along the Y-axis and time is represented along the X-axis. Signal 610 is received at separate times for each microphone due to varying microphone distances from the source of signal 610. Specifically, an arbitrary component 620 within signal 610 peaks at microphone A at a time $t_a$ 630. The same component 620 peaks at a time $t_b$ 634 for microphone B and at a time $t_c$ 638 for microphone C.

Figure 6B:
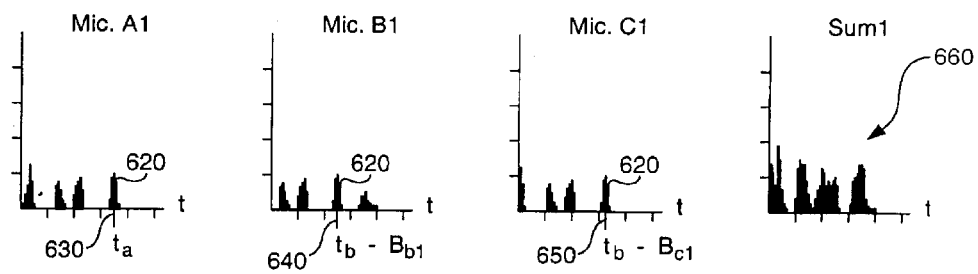
FIG. 6B is a mathematical representation of the signal received by the three microphones after they have been adjusted by a first set of beamforming parameters.

FIG. 6B shows signal 610 modified by the set of beamforming parameters for a first potential source. The set of beamforming parameters are calculated during initialization (steps 410 and 420) and consist of two numbers ($B_{b1}$, $B_{c1}$). A signal generated by a first potential source reaches microphone A at a time $B_{b1}$ different than it reaches microphone B. $B_{b1}$ can be either positive, negative or zero, depending upon whether the signal reaches microphone A before, after or at the same time that it reaches microphone B. Similarly, $B_{c1}$ represents the time interval between microphone A and microphone C receiving the signal.

In order to apply the beamforming parameters to the signal at microphone B, the entire signal is shifted by an amount equal to $B_{b1}$. Therefore, the arbitrary component 620 within signal 610 peaks at a time $(t_b - B_{b1})$ 640. Component 620 peaks at microphone C at a time $(t_c - B_{c1})$ 645. If the source of signal 610 were located at the first potential source, then both $(t_b - B_{b1})$ 640 and $(t_c - B_{c1})$ 650 would be equal to $t_a$ 630.

Figure 6C:
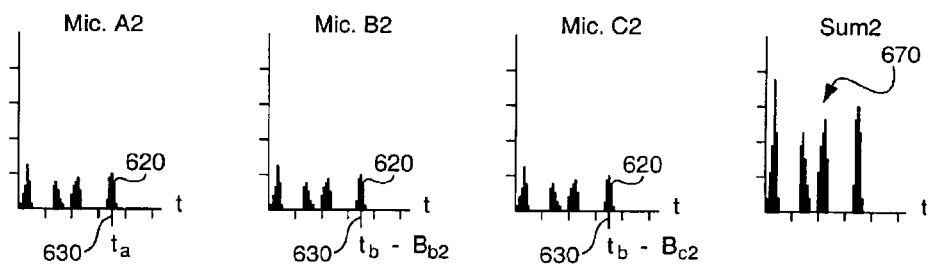
FIG. 6C is a mathematical representation of the signal received by the three microphones after they have been adjusted by a second set of beamforming parameters.

FIG. 6C shows signal 610 modified by the set of beamforming parameters ($B_{b2}$, $B_{c2}$) for a second potential source. Since component 620 peaks at time $t_a$ 630, which is equal to a time $(t_b - B_{b2})$ 630 and a time $(t_c - B_{c2})$ 630, the source of the signal is located at the second potential source.

There are many methods that may be used to determine whether the modified signals for each microphone match. For example, adding the modified signals from each microphone generates an aggregate signal for a potential source. The potential source that generates the loudest aggregate signal would be where the signal originated. When aggregate signal 660 in FIG. 6B (labeled "Sum1") is compared to aggregate signal 660 in FIG. 6C (labeled "Sum2"), the peak sound intensity for aggregate signal 670 in FIG. 6C exceeds the peak sound intensity for aggregate signal 660 in FIG. 6B.

In another aspect of the invention, calculations are performed in the frequency domain. As previously mentioned, a phase shift in the frequency domain is equivalent to a time shift in the time domain. Therefore, a method similar to that already described can be applied in the frequency domain.

In the last step 470 a decision is made whether to continue camera tracking. Camera tracking can be performed only once, be performed only at certain intervals, be continuous, or only be performed only if certain conditions are met (e.g., when sound is received). Unnecessary camera movement may be avoided by waiting until a certain amount of time has elapsed before moving the camera to ensure a new person is speaking, thereby limiting erroneous tracking due to coughing or errant comments. Camera tracking can also be performed by using multiple cameras and only activating the camera that frames the speaker or by using a PTZ (pan/tilt/ zoom) camera (mechanical or electronic).

Although the invention has been described in its presently contemplated best mode, it is clear that it is susceptible to numerous modifications, modes of operation and embodiments, all within the ability and skill of those familiar with the art and without the exercise of further inventive activity. Accordingly, that which is intended to be protected by Letters Patents is set forth in the claims and includes all variations and modifications that fall within the spirit and scope of the invention.

I claim:

1. An acoustic tracking system useful for determining the location of a sound producing acoustical source from within a set of at least two user-defined locations, comprising:
   (a) an array of microphones;
   (b) a processor coupled to the array of microphones;
   (c) a set of beamforming parameters calculated by the processor, each beamforming parameter within the set of beamforming parameters being associated with each user-defined location within the set of at least two user-defined locations;
   (d) a set of modified signals calculated by the processor, each modified signal within the set of modified signals being determined by applying each beamforming parameter within the set of beamforming parameters to the sound received by the array of microphones, wherein one of the modified signals is a best modified signal; and
   (e) a result location determined by the processor and contained within the set of at least two user-defined locations, the result location being the location associated with the best modified signal.

2. An acoustic tracking system of claim 1, wherein the user-defined locations are determined prior to a video conference.

3. An acoustic tracking system of claim 1, wherein the user-defined locations are determined at any time during a video conference.

4. An acoustic tracking system of claim 1, wherein the array of microphones includes at least three microphones.

5. An acoustic tracking system of claim 4, wherein the array of microphones is non-co-linear.

6. An acoustic tracking system of claim 1, wherein the best modified signal is determined as a function of signal strength and duration.

7. An acoustic tracking system of claim 1, wherein the result location is used to position a camera such that the camera focuses on the result location.

8. A camera tracking system of claim 1, wherein multiple cameras are used to frame each of the user-defined locations.

9. A camera tracking system of claim 1, wherein a camera capable of panning, tilting and zooming is used to frame each of the user-defined locations.

10. A camera tracking system capable of locating and framing an acoustical source producing a signal, comprising:
    (a) an input device able to define a set of at least two defined locations where the acoustical source may be located;
    (b) a camera capable of framing each of the defined locations;
    (c) an array of microphones able to receive the signal from the acoustical source;
    (d) a processor operably connected to the input device, the camera, and the array of microphones, the processor being able to calculate a set of beamforming parameters wherein each beamforming parameter is associated with a defined location from the set of defined locations, calculate a set of modified signals by applying the set of the beamforming parameters to the signal received by the array of microphones, identify a best modified signal from the set of modified signals, and instruct the camera to frame the location associated with the best modified signal.

11. A camera tracking system of claim 10, wherein the camera is a moveable camera.

12. A camera tracking system of claim 11, wherein the moveable camera is a camera capable of panning, tilting and zooming.

13. A camera tracking system of claim 10, wherein the best modified signal is determined as a function of signal strength and duration.

14. A method for identifying the location of an audio source comprising the steps of:
    (a) defining at least two points in space where the audio source may be located;
    (b) calculating beamforming parameters for each of the at least two points in space;
    (c) receiving sound by a microphone array;
    (d) applying each set of the beamforming parameters to the sound received by the microphones in the array;
    (e) determining which set of beamforming parameters maximize the sum amplitude of the signals received by the microphone array; and
    (f) identifying one of the at least two points in space associated with the set of beamforming parameters that maximize the sum amplitude of the microphone signals.

15. A method for locating and framing an acoustical source, comprising the steps of
    (a) defining at least two points in space where the acoustical source may be located;
    (b) calculating beamforming parameters for each of the at least two points in space;
    (c) receiving acoustical signals by a microphone array;
    (d) applying each set of the beamforming parameters to the acoustical signal received by the microphones in the array to produce a set of modified signals;
    (e) determining the best modified signal from the set of modified signals;
    (f) identifying one of the at least two points in space associated with the set of beamforming parameters that produce the best modified signal; and
    (g) directing at least one camera to frame the source of the best modified signal.

16. A method for locating and framing an acoustical source of claim 15, wherein multiple cameras are each framed to a defined location and activated by the processor when the acoustical source is determined to be at that defined location.

* * * * *